United States Patent
Tachibana et al.

(10) Patent No.: US 9,623,821 B2
(45) Date of Patent: Apr. 18, 2017

(54) VEHICLE BUMPER STRUCTURE AND BUMPER ABSORBER

(71) Applicant: TOYOTA JIDOSHA KABUSHIKI KAISHA, Toyota-shi, Aichi-ken (JP)

(72) Inventors: Yoshiyuki Tachibana, Toyota (JP); Kento Sawada, Toyota (JP); Masayuki Taguchi, Kariya (JP); Takahisa Itou, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/916,001

(22) PCT Filed: Sep. 25, 2014

(86) PCT No.: PCT/IB2014/001912
§ 371 (c)(1),
(2) Date: Mar. 2, 2016

(87) PCT Pub. No.: WO2015/044750
PCT Pub. Date: Apr. 2, 2015

(65) Prior Publication Data
US 2016/0207482 A1    Jul. 21, 2016

(30) Foreign Application Priority Data

Sep. 27, 2013   (JP) ................. 2013-202315

(51) Int. Cl.
*B60R 19/18*   (2006.01)
(52) U.S. Cl.
CPC ...... *B60R 19/18* (2013.01); *B60R 2019/1866* (2013.01); *B60R 2019/1886* (2013.01); *B60R 2019/1893* (2013.01)

(58) Field of Classification Search
CPC ........................................ B60R 19/18
USPC ................................. 293/102, 120
See application file for complete search history.

(56) References Cited

U.S. PATENT DOCUMENTS

| | | | | |
|---|---|---|---|---|
| 4,573,724 A | * | 3/1986 | Campen | B60R 19/26 188/379 |
| 4,592,580 A | * | 6/1986 | Stanganelli | B60R 19/18 267/33 |
| 5,114,198 A | | 5/1992 | Yamashita et al. | |
| 6,318,775 B1 | * | 11/2001 | Heatherington | B60R 19/18 293/120 |

(Continued)

FOREIGN PATENT DOCUMENTS

| | | |
|---|---|---|
| DE | 4037408 A1 | 6/1991 |
| EP | 2738047 A1 | 6/2014 |

(Continued)

*Primary Examiner* — Joseph D Pape
(74) *Attorney, Agent, or Firm* — Oliff PLC

(57) ABSTRACT

A vehicle bumper structure is provided with a functional component having a function other than an impact absorbing function, and an absorber is provided between a bumper cover and reinforcement. The absorber includes a first impact absorbing member that has a hole near the functional component, and a second impact absorbing member that is inserted into the hole and is more rigid than the first impact absorbing member. The second impact absorbing member may also have a protruding portion that protrudes outward on a side surface with respect to an insertion direction into the hole.

6 Claims, 11 Drawing Sheets

(56) References Cited

U.S. PATENT DOCUMENTS 7,073,831 B2 * 7/2006 Evans .................. B60R 19/34
                                                293/102

FOREIGN PATENT DOCUMENTS

| JP | H01-81150 U | 5/1989 |
| JP | 2003-146157 A | 5/2003 |
| JP | 2008-120096 A | 5/2008 |
| JP | 2011-110992 A | 6/2011 |
| WO | 2013/018409 A1 | 2/2013 |

* cited by examiner

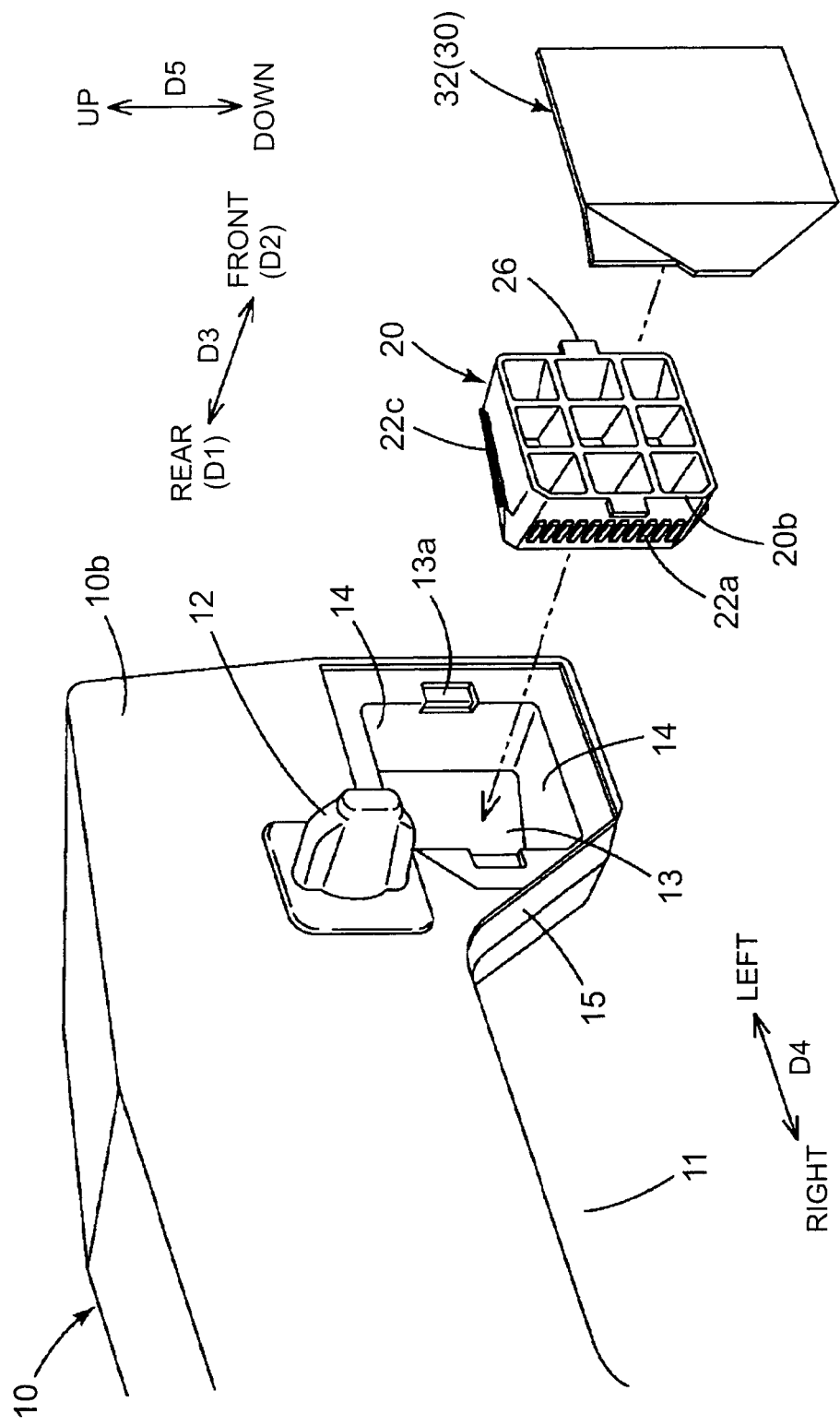

VEHICLE BUMPER STRUCTURE AND BUMPER ABSORBER

BACKGROUND OF THE INVENTION

1. Field of the Invention

The invention relates to a vehicle bumper structure and a bumper absorber.

2. Description of Related Art

A bumper designed to protect a vehicle body and absorb impact in order to lessen a load applied to a pedestrian in the event of a collision with a person is provided on the front and rear of a vehicle. A bumper absorber is provided between a bumper cover and a bumper reinforcement. Also, a functional component such as a reflective plate or a sensor is also provided in the bumper. The functional plate that receives and reflects light from a vehicle from behind is provided on both the left and right of a rear bumper, for example.

A vehicle bumper described in Japanese Utility Model Application Publication No. 1-81150 (JP 1-81150 U) does not have any functional components. This bumper includes a backup beam that is attached to the vehicle body via a pair of symmetrical stays that are separated from each other, and a face member that is attached to an outer surface of the backup beam via an impact energy absorbing member. The impact energy absorbing member is formed by a pair of high-density impact energy absorbing members arranged substantially symmetrically and separated from each other by a narrower distance than the distance between the stays, and a residual low-density impact energy absorbing member.

A vehicle bumper structure described in Japanese Patent Application Publication No. 2003-146157 (JP 2003-146157 A) also does not have any functional components. This bumper structure is formed by a bumper beam that is fixed to a vehicle, body frame via a stay, a buffer provided on the bumper beam, and a bumper face arranged on an outside of this buffer. The buffer is formed by an expanded foam buffer main body that is fixed to the bumper beam, and on which a recessed portion is formed on a vehicle outside surface, and an expanded foam reinforcing buffer that is fit into the recessed portion of the expanded foam main body.

When a reflective plate is provided on the left and right of the bumper and an impact is input near the reflective plate on the bumper cover, for example, the reflective plate may deform or become damaged even if the impact is light, which may reduce the function of the reflective plate. In this case, the reflective plate must be replaced. Here, if the rigidity of the entire bumper is high, the impact transmitted to the vehicle body when an impact is input to a bumper center portion increases, which may reduce the vehicle body protecting function, or increase a load applied to a pedestrian if in the event of a collision with a person, such that the pedestrian protecting function may decrease. These problems are not only limited to a reflective plate, but also exist when a functional component other than a reflective plate is provided on the bumper. The bumpers described in JP 1-81150 U and JP 2003-146157 A do not take into account the provision of a functional component on a bumper, so the problems described above may occur.

Also, in order to keep the reinforcing buffer from falling off of the buffer main body, the reinforcing buffer must be fixed to the buffer main body by an adhesive, or the reinforcing buffer must be inserted when the expanded foam buffer main body is formed.

SUMMARY OF THE INVENTION

The invention thus provides a novel vehicle bumper structure and bumper absorber.

A first aspect of the invention relates to a vehicle bumper structure that includes a functional component having a function other than an impact absorbing function, and an absorber provided between a bumper cover and a reinforcement. The absorber includes a first impact absorbing member that has a hole near the functional component, and a second impact absorbing member that is inserted into the hole and is more rigid than the first impact absorbing member.

When an impact is input to the bumper cover, the absorber absorbs this impact. An impact that is input to a location far from the functional component is absorbed by the first impact absorbing member. An impact that is input close to the functional component is absorbed by the second impact absorbing member that is more rigid than the first impact absorbing member. Therefore, with a light impact, deformation of or damage to the functional component is inhibited, so the function of the functional component is able to be maintained. Accordingly, with this aspect, when an impact is input, the impact is able to be absorbed and deformation of the functional component is able to be inhibited.

Also, a second aspect of the invention relates to a bumper absorber provided on a vehicle, which includes a first impact absorbing member defining a hole, and a second impact absorbing member that is inserted into the hole and is more rigid than the first impact absorbing member. The second impact absorbing member has a protruding portion that protrudes outward, the protruding portion provided on a side surface of the second impact absorbing member with respect to an insertion direction into the hole. Movement of the second impact absorbing member in a direction opposite the insertion direction is inhibited by the protruding portion biting into an inside wall of the hole in the first impact absorbing member.

With this aspect, the protruding portion of the second impact absorbing member that is inserted into the hole in the first impact absorbing member bites into the inside wall of the hold, such that the second impact absorbing member is inhibited from moving in the direction opposite the insertion direction. Therefore, this aspect makes it possible to obviate the need for a fixing member for the second impact absorbing member without insert forming.

Here, the position where the bumper structure and the bumper absorber are provided includes a front portion of a vehicle, a rear portion of a vehicle, and a side surface portion of a vehicle and the like. The functional component includes a reflective plate, a camera, a sensor that detects the distance to an obstacle, and a sensor that detects the proximity of an obstacle, and the like. The absorber may be contacting the bumper cover or not contacting the bumper cover. Also, the absorber may be contacting the reinforcement or not contacting the reinforcement. The hole in the first impact absorbing member includes a hole formed through the first impact absorbing member, and a hole that is recessed from the surface of the first impact absorbing member. The second impact absorbing member may be contacting the functional component, but deformation of the functional component when an impact is input is able to be further inhibited when the second impact absorbing member is separated from the functional component by the first impact absorbing member that is less rigid than the second impact absorbing member.

The aspect of the vehicle bumper structure makes it possible to provide a vehicle bumper structure that both absorbs an impact and inhibits deformation of the functional component, when an impact is input. The vehicle bumper structure may be such that it is possible to obviate the need for a fixing member for the second impact absorbing member without insert forming. The vehicle bumper structure may be such that the second impact absorbing member is able to be more easily inserted into the hole in the first impact absorbing member. The vehicle bumper structure may be such that it is possible to provide a vehicle bumper structure in which contact noise between the second impact absorbing member and at least one of the bumper cover and the reinforcement can be suppressed. The vehicle bumper structure may be such that it is possible to inhibit the second impact absorbing member from being inserted farther than designed into the hole in the first impact absorbing member. The vehicle bumper structure may be such that it is possible to provide a vehicle bumper structure having improved durability. The bumper absorber may be such that it is possible to provide a bumper absorber that obviates the need for a fixing member for the second impact absorbing member without insert forming.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 8 is a perspective view illustrating the manner in which the second impact absorbing member is attached, and the manner in which the cushioning material is affixed;

DETAILED DESCRIPTION OF EMBODIMENTS

Figure 1:
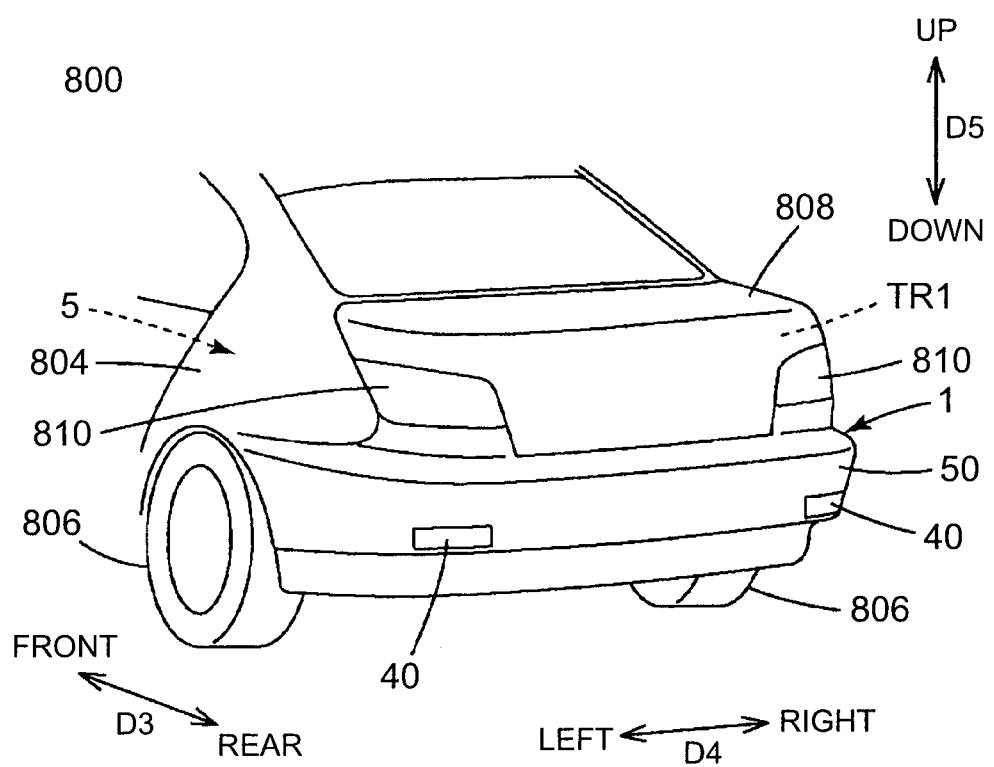
FIG. 1 is a perspective view illustrating a rear portion of a vehicle.

Hereinafter, example embodiments of the invention will be described with reference to the accompanying drawings. Naturally, the example embodiments below are merely examples illustrating the invention. All of the characteristics described in the example embodiments are not necessarily required to solve the problem to be solved by the invention.

(1) Summary of the Technology

First, a summary of the technology will be described with reference to FIGS. 1 to 10.

A vehicle bumper structure 2 includes a bumper cover 50, a reinforcement 60, an absorber 3, and a functional component 40. The absorber 3 includes a first impact absorbing member 10 that has a hole 13 near the functional component 40, and a second impact absorbing member 20 that is inserted, into the hole 13. When an impact is input to the bumper cover 50, the absorber 3 absorbs this impact. An impact input near the functional component 40 is absorbed by the second impact absorbing member 20, that is more rigid than the first impact absorbing member 10. Therefore, if the impact is light, deformation of and damage to the functional component 40 is inhibited, so the function of the functional component 40 is maintained.

The second impact absorbing member 20 may have a protruding portion 22 that protrudes outward D11, the protruding portion 22 provided on a side surface 21 of the second impact absorbing member 20 with respect to an insertion direction D1 into the hole 13 (i.e., the direction in which the second impact absorbing member 20 is inserted into the hole 13). Also, movement of the second impact absorbing member 20 toward a direction (D2) opposite the insertion direction D1 may be inhibited by the protruding portion 22 biting into an inside wall 14 of the hole 13 in the first impact absorbing member 10. In this case, when the second impact absorbing member 20 is inserted into the hole 13 such that the protruding portion 22 bites into the inside wall 14 of the hole 13, movement of the second impact absorbing member 20 in the direction (D2) opposite the insertion direction D1 is inhibited, so the second impact absorbing member 20 is inhibited from falling out of the hole 13. Therefore, this mode obviates the need for a fixing member for the second impact absorbing member 20, even without insert forming.

The protruding portion 22 may have an inclined portion 24 that is inclined toward the side surface 21 of the second impact absorbing member 20, on the insertion direction D1 side of an apex portion 23 of the protruding portion 22. In this case, the protruding portion 22 gradually bites into the inside wall 14 of the hole 13 when the second impact absorbing member 20 is inserted into the hole 13. Also, the protruding portion 22 may have a vertical wall portion 25 that inhibits the second impact absorbing member 20 from moving in the direction (D2) opposite the insertion direction D1 of the second impact absorbing member 20 by catching on the inside wall 14 of the inside wall 14 on the side opposite the insertion direction D1 of the apex portion 23. Therefore, the second impact absorbing member 20 is inhibited from falling out of the hole 13 by the vertical wall portion 25 of the protruding portion 22 that bites into the inside wall 14 of the hole 13 catching on the inside wall 14 of the hole 13. Accordingly, this mode makes it easier to insert the second impact absorbing member 20 into the hole 13 in the first impact absorbing member 10, as well as obviates the need for a fixing member for the second impact absorbing member 20.

With at least one of the bumper cover 50 and the reinforcement 60 as a counterpart member 4, a member (30) that suppresses contact noise between the second impact absorbing member 20 and the counterpart member 4 may be provided on a portion of the second impact absorbing member 20 that faces the counterpart member 4. The member (30) that suppresses contact noise may include fabric such as nonwoven fabric, or elastic material such as an elastomer, or the like.

The second impact absorbing member 20 may have an extended portion 26 that protrudes outward D11 from an edge portion 21*e* of the second impact absorbing member 20 on the side opposite the insertion direction D1, the extended portion 26 provided on the side surface 21 of the second impact absorbing member 20 with respect to the insertion direction D1 into the hole 13. Also, the extended portion 26 may inhibit the second impact absorbing member 20 from moving in the insertion direction D1 by catching on the first impact absorbing member 10. This mode makes it possible to inhibit the second impact absorbing member 20 from being inserted into the hole 13 in the first impact absorbing member 10 farther than intended (i.e., designed).

The second impact absorbing member 20 may be wider on the reinforcement 60 side than on the bumper cover 50 side in a vertical cross-section in the insertion direction D1 into the hole 13. This mode makes it possible to provide the vehicle bumper structure 2 with improved durability.

(2) Specific Example

FIG. 1 is a view of an example of a rear portion of a vehicle 800. In the drawing, FRONT, REAR, LEFT, RIGHT, UP, and DOWN indicate the front, rear, left, right, up, and down, respectively. The left/right positional relationship is based on a direction looking ahead of the vehicle. Also, reference character D3 denotes a longitudinal (front/rear) direction, reference character D4 denotes a vehicle width direction, and reference character D5 denotes a vertical direction. These directions D3, D4, and D5 are all orthogonal to each other, but the invention also includes a case in which they are not orthogonal due to error or the like, as long as they intersect each other. In order to facilitate understanding, the enlargement factor of these directions D3, D4, and D5, may differ, so the drawings may not all match.

The vehicle 800 shown in FIG. 1 is an on-road driving vehicle designed and equipped to be used on a road, and is a sedan-type passenger vehicle with a trunk TR1 formed behind a vehicle cabin. A rear exterior 804 that covers a rear vehicle body (panel) 5, and rear wheels 806, are provided on a rear portion of the vehicle 800. The vehicle body 5 is made of metal material or the like, such as steel sheet. The rear exterior 804 includes a trunk lid 808 that covers the trunk TR1, a tail lamp 810, and a rear bumper 1. The rear bumper 1 includes the vehicle bumper structure 2 shown in FIG. 2, and the absorber 3. A reflective plate (i.e., the functional component 40) is provided on the left and right of the bumper cover 50 that covers the absorber 3. The vehicle to which the invention can be applied may also be a station wagon or the like, as long as it has a bumper.

Figure 2:
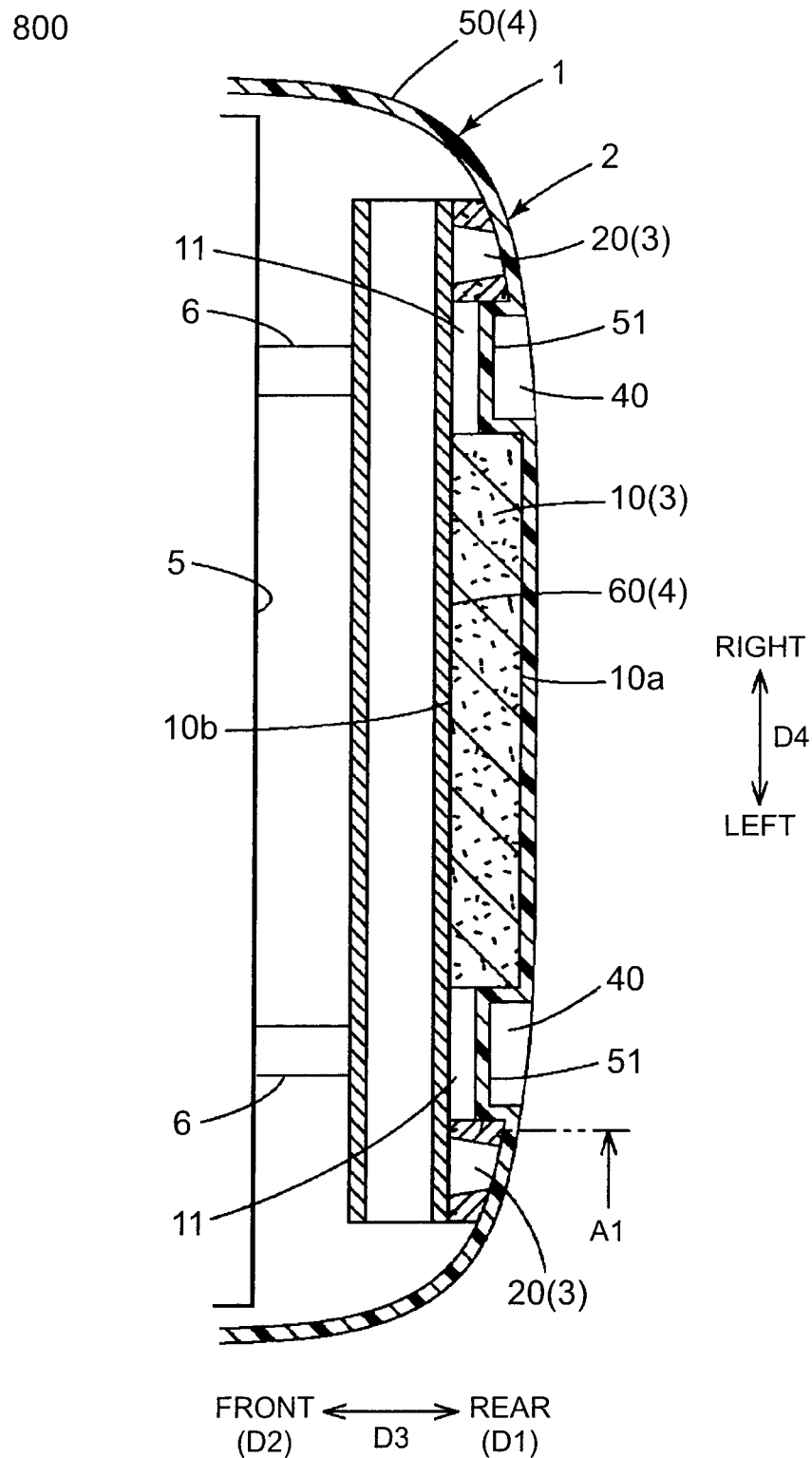
FIG. 2 is a horizontal sectional view illustrating the rear portion of the vehicle.
Figure 3:
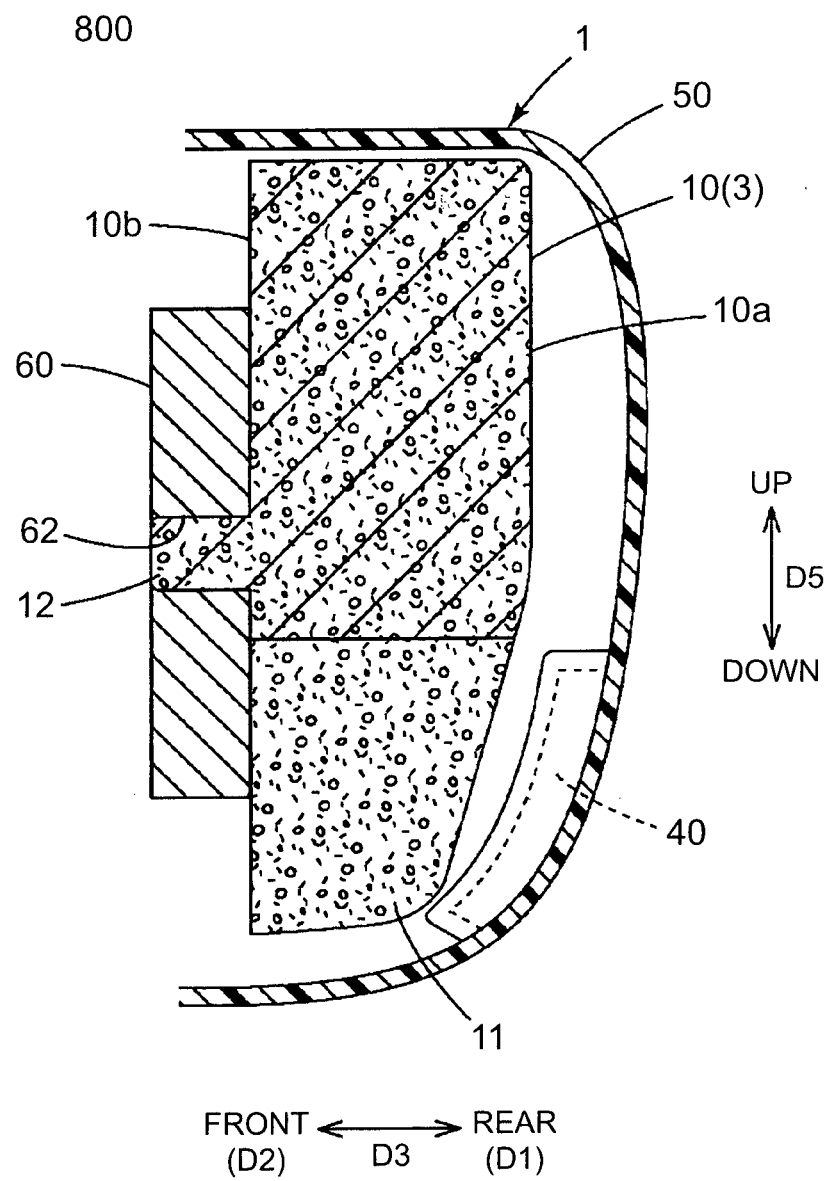
FIG. 3 is a vertical sectional view illustrating the rear portion of the vehicle.
Figure 4A:
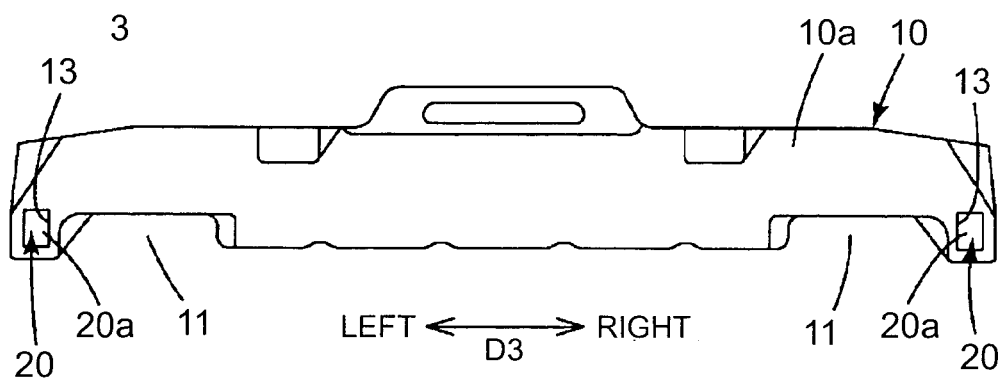
FIG. 4A is a view illustrating a bumper cover side of an absorber.
Figure 4B:
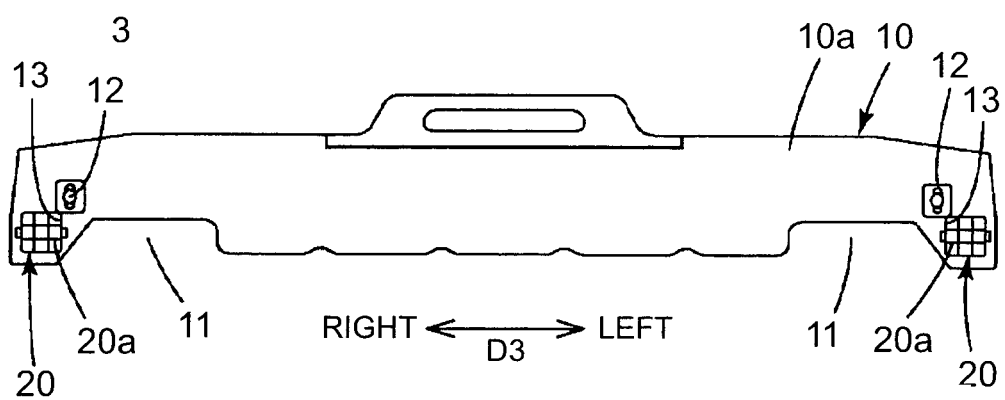
FIG. 4B is a view illustrating a reinforcement side of the absorber.
Figure 5A:
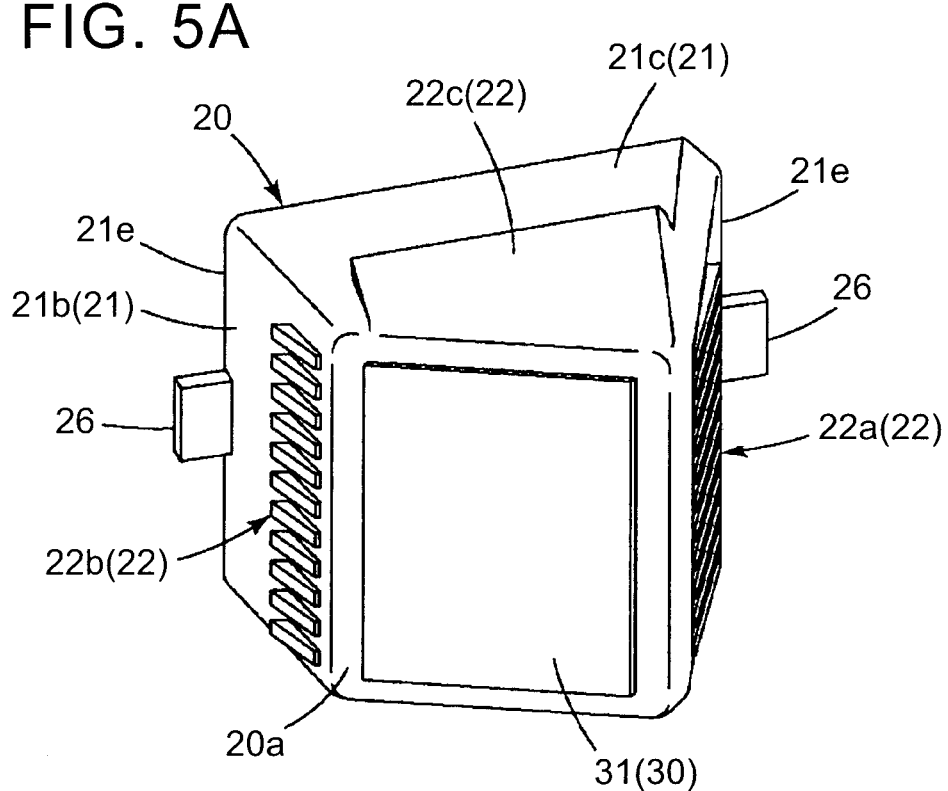
FIG. 5A is a view illustrating the bumper cover side of a second impact absorbing member to which cushioning material is affixed.
Figure 5B:
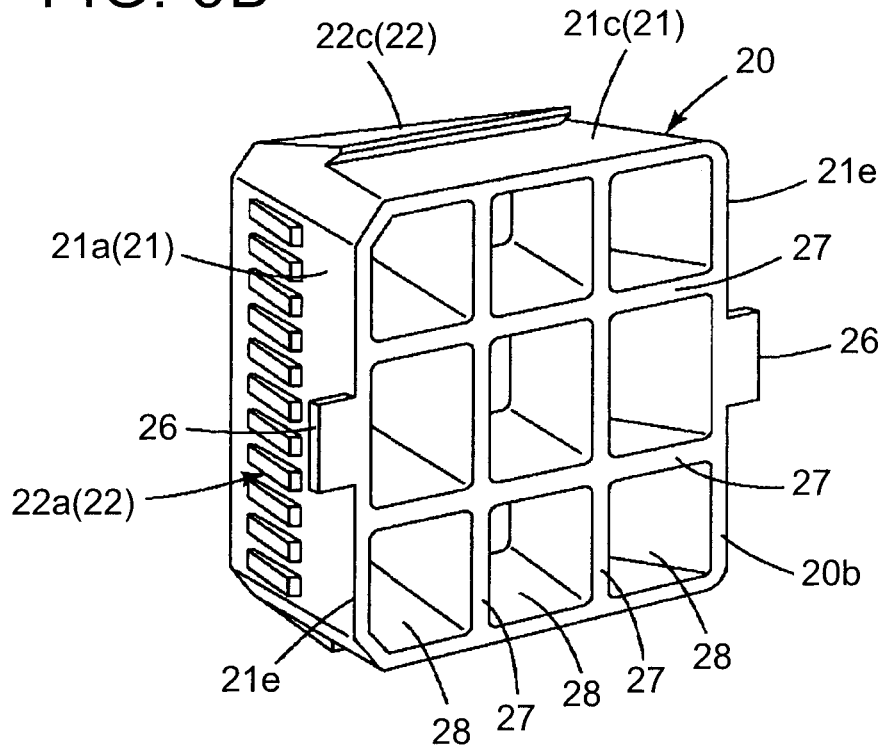
FIG. 5B is a view illustrating the reinforcement side of the second impact absorbing member.
Figure 6A:
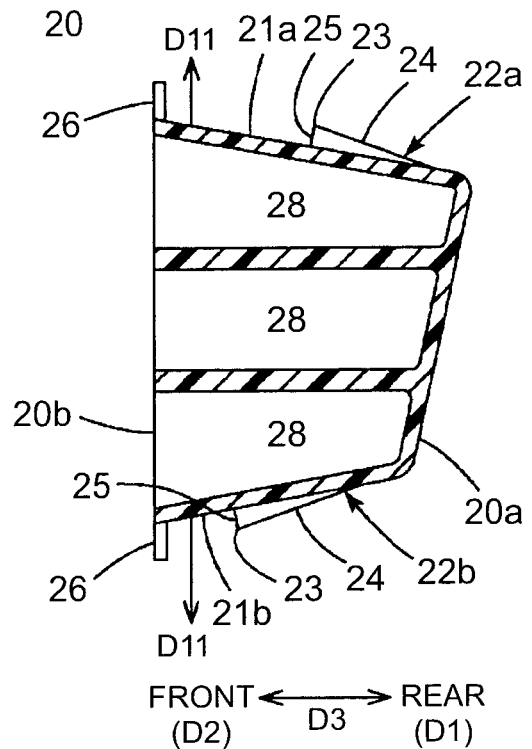
FIG. 6A is a horizontal sectional view illustrating the second impact absorbing member.
Figure 6B:
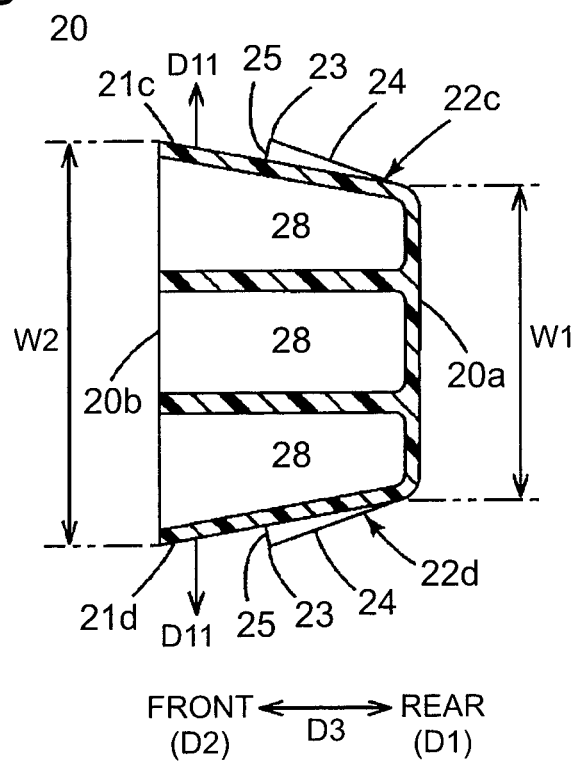
FIG. 6B is a vertical sectional view illustrating the second impact absorbing member.
Figure 9A:
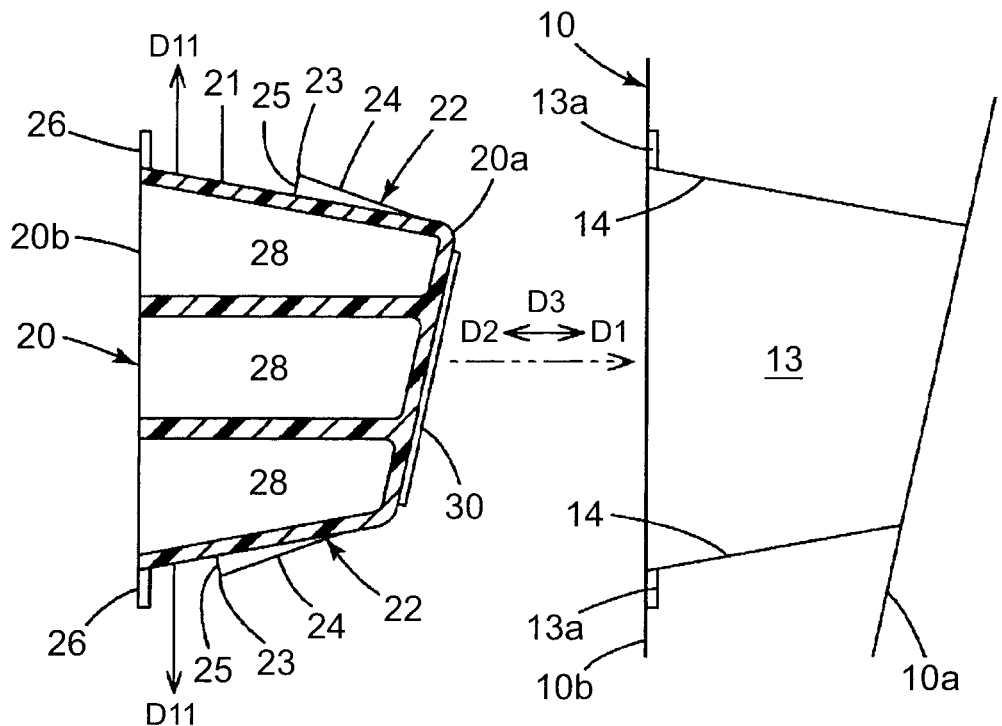
FIG. 9A is a view illustrating the manner in which the second impact absorbing member is inserted into a hole in a first impact absorbing member.
Figure 9B:
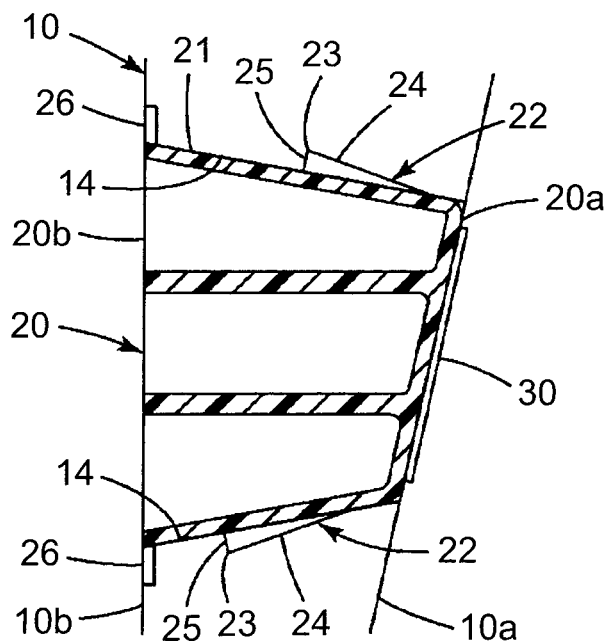
FIG. 9B is a view illustrating the manner in which the second impact absorbing member is inserted into the hole in the first impact absorbing member.
Figure 10:
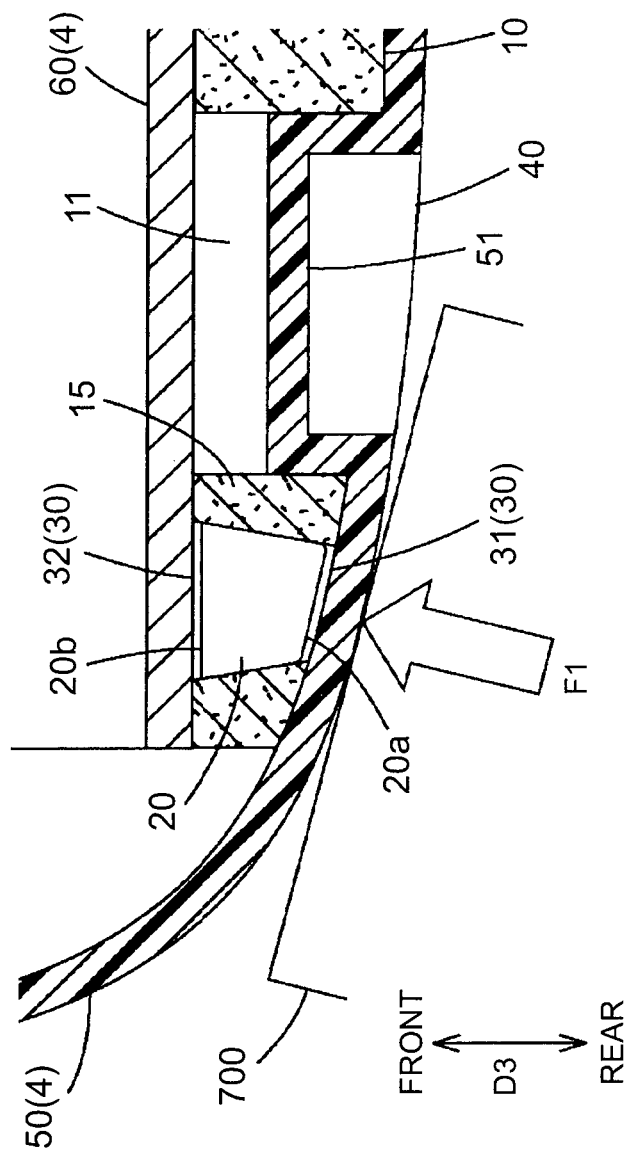
FIG. 10 is a view illustrating the manner in which a light impact is input near the functional component of the bumper cover.

FIG. 2 is a view illustrating a horizontal cross-section of the rear portion of the vehicle 800. FIG. 3 is a vertical sectional view illustrating the rear portion of the vehicle 800. FIGS. 4A and 4B are views illustrating the absorber 3. FIG. 4B is a view of an example of the positional relationship of the functional component 40 and the absorber 3. FIGS. 5A and 5B are views illustrating the outside of the second impact absorbing member 20 to which cushioning material 31 is affixed. FIGS. 6A and 6B are horizontal sectional views illustrating a cross-section of the second impact absorbing member 20. FIGS. 7A to 7D are views illustrating the side surface 21 of the second impact absorbing member 20, with the back not shown. FIG. 8 is a view illustrating the manner in which the second impact absorbing member 20 is attached, and the manner in which cushioning material 30 is affixed. FIGS. 9A and 9B are views illustrating the manner in which the second impact absorbing member 20 is inserted into the hole 13. FIG. 10 is, a view illustrating the manner in which a light impact is input from the rear at an angle. In the drawings, reference character D1 denotes the insertion direction of the second impact absorbing member 20 into the hole 13. Reference character D2 denotes a direction opposite the insertion direction D1, and indicates the direction in which the second impact absorbing member 20 will fall out of the hole 13. Reference character D11 denotes an outward direction from the side surface 21 with respect to the insertion direction D1 of the second impact absorbing member 20. The hatching indicating the cross-section of the first impact absorbing member 10 is omitted in FIGS. 9A and 9B to facilitate understanding.

The vehicle bumper structure 2 shown in the drawings includes the reinforcement 60, the bumper cover 50, the functional component 40, and the absorber 3.

As shown in FIG. 2, a stay 6 is attached to each of the right and left rear portion of the vehicle body 5. These stays 6 are substantially symmetrical arranged and separated from each other. Parts made of metal members such as steel sheets or the like that have been formed into cylindrical shapes may be used for these stays 6, and the stays 6 are arranged with the length direction thereof pointing toward the front and rear. The reinforcement 60 has a length close to the width of the vehicle 800, is arranged with a length direction pointing in the vehicle width direction D4, and is attached to a rear end portion of the pair of stays 6 that are fixed to the vehicle body 5. The reinforcement 60 is formed long by, for example, extrusion forming a metal member such as a metal plate, for example, in a cylindrical shape with a rectangular cross-section. Any of a variety of structures are conceivable for the reinforcement, which is formed such that the required strength and impact absorbing ability to protect the vehicle body in the event of a collision or the like is able to be obtained. Also, the reinforcement serves to absorb impact by being crushed, as well as serves as a base for displaying an impact absorbing function by the absorber being crushed. The reinforcement 60 shown in FIG. 3 has a fitting portion 62 that receives a protrusion-shaped fitting portion 12 of the absorber 3. The fitting portion 62 is a through-hole for attaching and fixing the absorber 3, and is formed on both the left and right of the reinforcement 60.

The bumper cover 50 has a length the width of the vehicle 800 in the vehicle width direction D4, is arranged with a length direction pointed in the vehicle width direction D4, and is attached to the vehicle body 5 by an engaging member such as a clip, for example. The bumper cover 50 is formed in a curved shape that bulges out toward the rear in a plan view. The bumper cover 50 that has a thin plate shape may be formed by, for example, forming resin molding material having a synthetic resin such as a thermoplastic resin or a thermosetting resin, by press forming or injection molding or the like. The resin bumper cover 50 has a thin plate shape, so impact that is input is mainly absorbed by the absorber 3, and that which is unable to be absorbed by the absorber 3 is absorbed by the reinforcement 60.

A void 51 within with the functional component (40) is arranged is formed on both the left and right of the bumper cover 50 shown in FIG. 2. This void 51 is formed by a recess toward the reinforcement 60 side, for example. A through-hole through which a screw to mount the functional component (40) passes is formed in the bumper cover 50 at the portion where the void 51 is formed. The bumper cover 50 to which the functional component (40) is mounted covers the reinforcement 60 and the absorber 3 from the rear side to an end surface in the vehicle width direction D4, and is given an aesthetically pleasing design. Also, the bumper cover also serves to protect the reinforcement 60 and the absorber 3 so that the impact absorbing performance of these will not decrease.

The functional component 40 has a function other than the impact absorbing function. The functional component 40 includes a reflective plate, a camera, a sensor, and the like, as described above. The reflective plate is a member that receives and reflects light from a vehicle from behind. A reflective plate of a color in compliance with regulations, such as red, is used on the rear bumper. When a boss with a screw hole is formed on a back side of the functional component 40 that is fitted into the recess-shaped void 51, for example, the functional component 40 is fixed to the bumper cover 50 by fitting the functional component 40 into the recess-shaped void 51, passing a screw through the through-hole in the bumper cover 50 from the back side, and screwing the screw into the screw hole. Aside from the bumper cover 50, the functional component 40 may be mounted to the reinforcement 60 or the absorber 3 (preferably the first impact absorbing member 10) or the like.

The absorber 3 having the impact absorbing function includes the second impact absorbing member 20 that is relatively harder than the first impact absorbing member 10 that is relatively soft, and is provided between the bumper cover 50 and the reinforcement 60. The absorber 3 absorbs the impact when an impact is input, thus reducing the impact transmitted to the vehicle body 5, and reducing the reaction force on the object that is collided with. A resin foam molded body formed by fusing foamable resin molding material (including foamable resin particles) together while filling it into a forming die and heating it, a blow-molded body (a type of resin molded body) formed in the air while blowing air into a parison in which resin has been melted in a cylindrical shape, or a resin injection molded body (a type of resin molded body) formed by injection molding resin such that it takes on the required shape, or the like may be used for the absorber.

A void 11 that matches the arrangement of the functional component 40 is formed on both the left and right of the first impact absorbing member 10 shown in FIG. 2 and the like. The void 11 shown in FIGS. 4A and 4B is an empty space in the thickness direction (front-rear direction) of the first impact absorbing member 10, where the first impact absorbing member 10 is not present on the reinforcement 60 side of the functional component 40. Naturally, the void in the first impact absorbing member may also be shaped such that the first impact absorbing member is present on the reinforcement side of the functional component.

The hole 13 into which the second impact absorbing member 20 is inserted is formed to the outside in the vehicle width direction D4 of the void 11. This hole 13 is a hole for mounting the second impact absorbing member 20, and is formed near the functional component 40. When described with reference to FIG. 4C, a minimum distance L1 between the hole 13 (the second impact absorbing member 20) and the functional component 40 is preferably 5 to 100 mm, more preferably 7 to 70 mm, and even more preferably 10 to 50 mm. N1 to N2 means equal to or greater than N1 and equal to or less than N2. The inside wall 14 of the hole 13 has a shape that matches the side surface 21 excluding the protruding portion 22 of the second impact absorbing member 20. As shown in FIG. 9A, the opening of the hole 13 in a surface 10*b* on the reinforcement 60 side in a cross-section in the insertion direction D1 is wider than the opening of the hole 13, in a surface 10*a* on the bumper cover 50 side. Here, the cross-section in the insertion direction D1 refers to a plane that has been cut by a plane that includes a straight line that passes through the hole 13 and is parallel to the insertion direction D1. A shallow recess 13*a* into which an extended portion 26 of the second impact absorbing member 20 that is inserted into the hole 13 fits is formed around the hole 13 in the surface 10*b* on the reinforcement side. As shown in FIG. 6 and the like, the fitting portion 12 that protrudes toward the reinforcement 60 side (i.e., the front side) is formed on both the left and right of the surface 10*b* on the reinforcement side of the first impact absorbing member 10. When this protrusion-shaped fitting portion 12 is inserted into a through-hole (i.e., the fitting portion 62) of the reinforcement 60, the first impact absorbing member 10 is fixed to the reinforcement 60. Naturally, the fixing means of the absorber 3 is not limited to the fitting portions 12 and 62, and may be adhesion, for example.

Figure 4C:
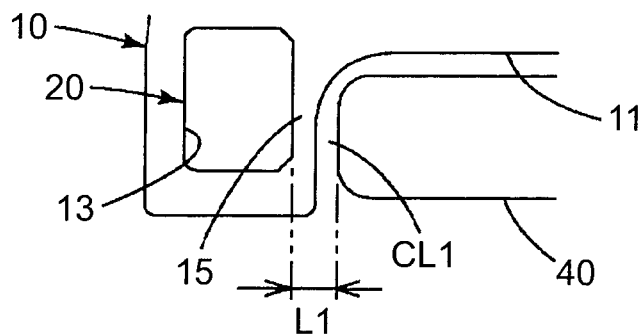
FIG. 4C is a view illustrating the positional relationship of a functional component and the absorber.

As shown in FIG. 4C, the first impact absorbing member 10 has an interposed portion 15 arranged between the second impact absorbing member 20 and the functional component 40. When there is a clearance CL1 between the interposed portion 15 and the functional component 40, air may be present in this clearance CL1, or the bumper cover 50 or the like may be present in this clearance CL1. This clearance. CL1 does not have to be provided. However, when the clearance CL1 is provided, impact tends not to be transmitted from the first impact absorbing member 10 to the functional component 40 when an impact is input, so the functional component 40 will not easily deform.

The first impact absorbing member 10 is preferably a resin foam molded body that is less rigid than the second impact absorbing member 20. A thermoplastic resin, such as polystyrene (PS), polypropylene (PP), or polystyrene/polyethylene copolymer, or the like may be used for the resin molding material used in this resin foam molded body. When forming the resin foam molded body, the resin foam molded body may be formed by injecting foamable resin molding material into a die in the shape of the first impact absorbing member, and foaming (i.e., expanding) this material. Also, a bead foam molded body may be formed by first forming a large quantity of foamable resin particles that have been pre-foamed to a predetermined scale factor by impregnating bead-shaped plastic with a foaming agent, and then filling the large quantity of foamable resin particles into a die, and heating, softening, and foaming these foamable resin particles. A volatile foaming agent that generates hydrocarbons such as butane or pentane, or an inorganic foaming agent that generates carbon dioxide gas, or the like may be used for this foaming agent. The foaming scale factor of the foam molded body may be 20 to 50 times, for example. The resin molding material may include an additive such as a filler.

Meanwhile, the second impact absorbing member 20 that is inserted into the hole 13 is preferably a resin molded body that is more rigid than the first impact absorbing member 10, or a low foaming resin foam molded body, in order to display a function of reinforcing the absorber 3 near the functional component 40. A thermoplastic resin or the like, e.g., a polyolefin such as PP or polyethylene (PE), or a resin in which an elastomer has been added to a polyolefin, or the like may be used for the resin molding material (including an elastomer) that is used in the resin molded body formed essentially without foaming the resin. The resin molding, material may also include an additive such as a filler. Injection molding or press forming, or the like may be used to form the resin molding material. When a low foaming resin foam molded body is used for the second impact absorbing member 20, the foaming scale factor of the foam molded body may be 2 to 10 times, for example.

The rigidity of the impact absorbing members 10 and 20 is indicated by the difficulty with which the impact absorbing members 10 and 20 bend when force is applied between them. When the deformation of the first impact absorbing member 10 is greater than the deformation of the second impact absorbing member 20, it may be said that the rigidity of the second impact absorbing member 20 is higher than the rigidity of the first impact absorbing member 10. When the protruding portion 22 of the second impact absorbing member 20 bites into the inside wall of the hole 13 in the first impact absorbing member 10, the rigidity of the second impact absorbing member 20 is higher than the rigidity of the first impact absorbing member 10. Typically, the resin molded body formed essentially without foaming the resin is more rigid than a resin foam molded body. A low foaming resin foam molded body is more rigid than a resin foam molded body with a higher foaming scale factor.

As shown in FIGS. 5 and 6, the second impact absorbing member 20 has a plurality of cavities 28 that are defined by a plurality of ribs 27. A surface 20a of the second impact absorbing member 20 on the bumper cover 50 side is closed and a surface 20b of the second impact absorbing member 20 on the reinforcement 60 side is open. There are a total of four ribs 27 shown in FIG. 5B, i.e., two connected to surfaces 21a and 21b that are on opposite sides from each other in the vehicle width direction D4, and two that are connected to surfaces 21c and 21d that are on opposite sides from each other in the vertical direction D5. Naturally, when the number of ribs that are connected to the surfaces 21a and 21b is n1, and the number of ribs that are connected to the surfaces 21c and 21d is n2, n1 may be different from n2. n1 may also be zero, one, or three or the like, and n2 may also be zero, one; or three or the like. The impact absorbing performance of the second impact absorbing member 20 may be adjusted according to the number and thickness of the ribs 27. For example, to make the second impact absorbing member 20 more difficult to deform, the number of ribs may be increased, or the ribs may be made thicker. In order to make the second impact absorbing member 20 easier to deform, the number of ribs may be reduced, or the ribs may be made thinner.

The second impact absorbing member 20 shown in FIGS. 6A and 6B and the like is wider on the reinforcement 60 side than on the bumper cover 50 side in a cross-section in the insertion direction D1. Here, the cross-section in the insertion direction D1 refers to a plane that has been cut by a plane that includes a straight line that passes through the second impact absorbing member 20 and is parallel to the insertion direction D1. When described with reference to FIG. 6B, a width W2 of the surface 20b on the reinforcement side is wider than a width W1 of the surface 20a on the bumper cover side, in a cross-section in the insertion direction D1 of the second impact absorbing member 20. The rigidity of the reinforcement 60 is higher than the rigidity of the bumper cover 50, so the surface 20b on the reinforcement 60 side that is wider than the bumper cover 50 side is supported by the relatively highly rigid reinforcement 60 when an impact is input. Therefore, the durability of the vehicle bumper structure is good. Naturally, the basic effect of the invention is able to be obtained even if the bumper cover 50 side is wider than the reinforcement 60 side. The basic effect of the invention is also able to be obtained even if the bumper cover 50 side is the same width as the reinforcement 60 side.

Figure 7A:
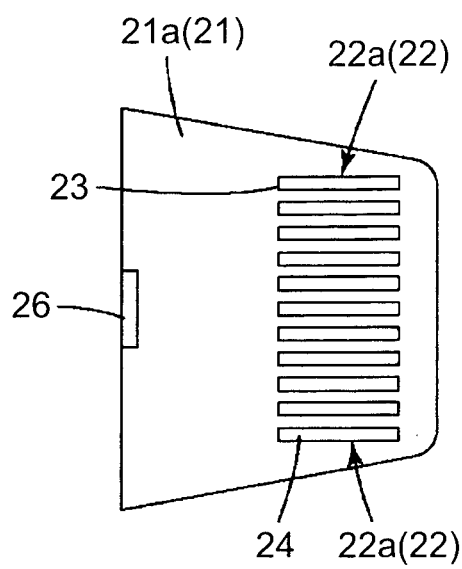
FIG. 7A is a view illustrating a surface of the second impact absorbing member that is on a vehicle width direction inside.
Figure 7B:
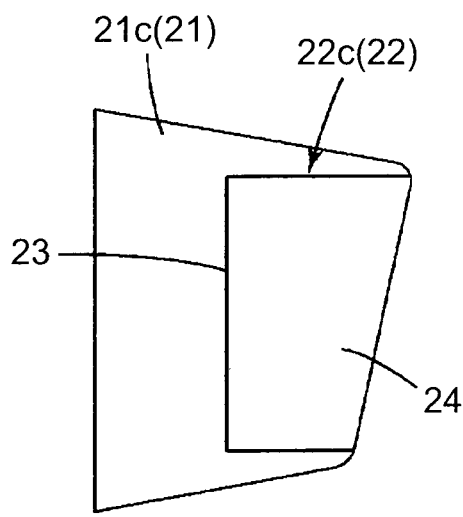
FIG. 7B is a view illustrating an upper surface of the second, impact absorbing member.
Figure 7C:
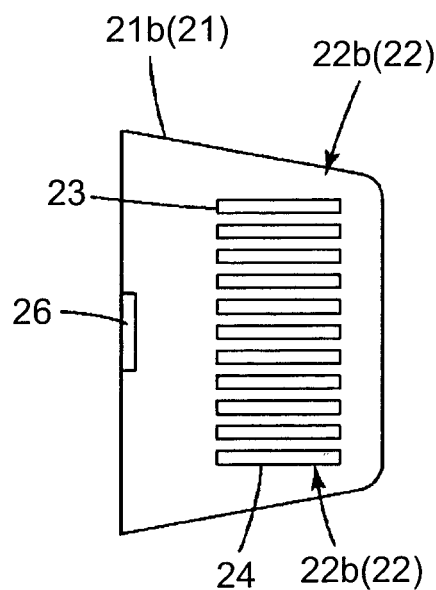
FIG. 7C is a view illustrating a surface of the second impact absorbing member that is on a vehicle width direction outside.
Figure 7D:
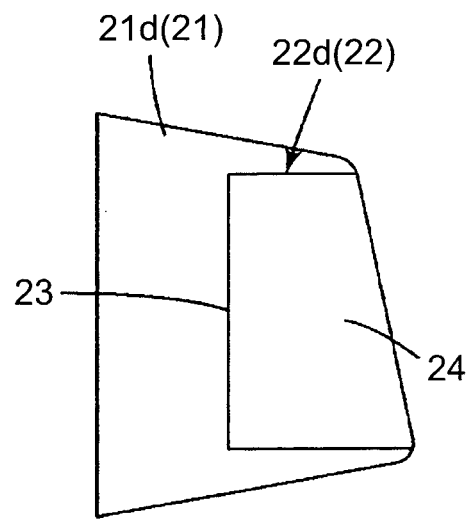
FIG. 7D is a view illustrating a lower surface of the second impact absorbing member.

As shown in FIGS. 6A and 6B, the second impact absorbing member 20 that is inserted into the hole 13 has the protruding portion 22 that protrudes outward D11, the protruding portion 22 provided on the side surface 21 of the second impact absorbing member 20 with respect to the insertion direction D1 into the hole 13. Here, the side surface 21 refers to a surface other than the end surface (20a) in the insertion direction D1 and the end surface (20b) in the separating direction D2, such as a side surface of a square column or a circular column or the like, and includes the surface 21a on the vehicle width direction inside, the surface 21b on the vehicle width direction outside, the upper surface 21c, and the lower surface 21d. A plurality of protruding portions 22a are arranged spaced apart in the vehicle width direction D4 with the length direction headed in the insertion direction D1, on the surface 21a on the vehicle width direction inside, as shown in FIG. 7A. A plurality of protruding portions 22b are arranged spaced apart in the vehicle width direction D4 with the length direction headed in the insertion direction D1, on the surface 21b on the vehicle width direction outside, as shown in FIG. 7C. The number of protruding portions 22b may be the same as the number of protruding portions 22a as shown in FIGS. 7A and 7C, or it may be different. A single protruding portion 22c is formed on the upper surface 21c, as shown in FIG. 7B. A single protruding portion 22d is formed on the lower surface 21d, as shown in FIG. 7D. Naturally, the invention also includes a case in which at least one of the protruding portions 22c and 22d is divided into a plurality of sections.

The protruding portion 22 is a pawl-shaped portion that has an apex portion 23, an inclined portion 24, and a vertical wall portion 25. The inclined portion 24 of the protruding portion 22 that protrudes outward D11 from the side surface 21 is on the insertion direction D1 side of the apex portion 23 that is highest from the side surface 21. The inclined portion 24 shown in the drawings is inclined toward the side surface 21 farther toward the bumper cover 50 side of the apex portion 23. The vertical wall portion 25 is on the separating direction D2 side of the apex portion 23 (i.e., the opposite side from the insertion direction D1). The vertical wall portion 25 shown in the drawings has a surface that is inclined more than the inclined portion 24. By providing the inclined portion 24 on the protruding portion 22, the protruding portion 22 gradually bites into the inside wall 14 of the hole when the second impact absorbing member 20 is inserted into the hole 13, thus making it easier to insert the second impact absorbing member 20 into the hole 13. This effect is still able to be obtained even without the vertical wall portion 25, e.g., even if a second inclined portion that has an inclination equal to or less than the inclination of the inclined portion 24 is provided on the separating direction D2 side of the apex portion 23. The vertical wall portion 25 inhibits the second impact absorbing member 20 from moving in the separating direction D2 (i.e., the direction opposite the insertion direction D1) by catching on the inside wall 14 when the protruding portion 22 bites into the inside wall 14 of the hole. Inhibiting movement in this case means making movement difficult, and is not limited to completely preventing movement. For example, the second impact absorbing member 20 will be inhibited from moving in the separating direction D2 as long as the second impact absorbing member 20 does not fall out of the hole 13 when the reinforcement 60 side of the first impact absorbing member 10 into which the second impact absorbing member 20 is inserted is pointed downward. Accordingly, the second impact absorbing member 20 is inhibited from moving in the separating direction D2 by the protruding portion 22 biting into the inside wall 14 of the hole. This effect is still able to be obtained even without the inclined portion 24, e.g., even if a second vertical wall portion is provided on the insertion direction D1 side of the apex portion 23.

The length direction of the plurality of protruding portions 22a and 22b formed on the surfaces 21a and 21b, respectively, that are on opposite sides from each other in the vehicle width direction D4 is headed in the insertion direction D1. Therefore, the protruding portions 22a and 22b are guided into the insertion direction D1, so the second impact absorbing member 20 can be smoothly inserted into the hole 13. Meanwhile, if the depth to which the surface 21a on the vehicle width direction inside is inserted into the hole 13 is different from the depth to which the surface 21b on the vehicle width direction outside is inserted into the hole 13, the orientation of the protruding portions 22c and 22d formed on the surfaces 21c and 21d, respectively, which are on opposite sides from each other in the vertical direction D5, may be off from the orientation in which they are inserted into the hole 13. Thus, if at least one of the protruding portions 22c and 22d is divided into a plurality of sections, the second impact absorbing member 20 will be inserted into the hole 13 in a state in which the orientation of the protruding portions 22c and 22d is off from the orientation in which they are inserted into the hole 13, and as a result, the inside wall 14 around the protruding portions 22c and 22d will end up denting outward D11 of the surfaces 21c and 21d. In this case, the protruding portions 22c and 22d will not catch as well on the inside wall 14. The protruding portions 22c and 22d shown in FIGS. 6 and 7 are provided one on each surface 21c and 21d, so a decrease in the ability of the protruding portions 22c and 22d to catch on the inside wall 14 due to the orientation of the protruding portions 22c and 22d being off from the orientation in which they are inserted into the hole 13 is able to be inhibited.

If the second impact absorbing member 20 is injection molded, the pawl-shaped protruding portion 22 is able to be easily formed. On the other hand, if the second impact absorbing member 20 is formed by injection molding, for example, the length direction of the protruding portions 22c and 22d has to be off from the insertion direction D1 considering detachability when at least one of the protrusion portions 22c and 22d is divided into a plurality of sections. This is because depth to which the surface 21a on the vehicle width direction inside is inserted into the hole 13 is different from the depth to which the surface 21b on the vehicle width direction outside is inserted into the hole. Forming one of the protruding portions 22c and 22d on each of the surfaces 21c and 21d makes the second impact absorbing member 20 easier to form.

Also, the extended portion 26 protrudes outward D11 from an edge portion 21e on the separating direction D2 side (i.e., the side opposite the insertion direction D1) on both of the surfaces 21a and 21b of the second impact absorbing member 20, as shown in FIG. 6A and the like. As shown in FIG. 9B, the extended portion 26 the extended portion 26 inhibits the second impact absorbing member 20 from moving in the insertion direction D1 by catching on the first impact absorbing member 10 (i.e., the recess 13a around the hole 13) when the second impact absorbing member 20 is inserted into the second impact absorbing member 20. Although position of the surface 20a of the second impact absorbing member 20 inserted into the hole 13 is preferably such that the surface 20a is always able to support the bumper cover 50 when it protrudes slightly on the bumper cover 50 side from the surface 10a of the first impact absorbing member 10, it may be slightly back (i.e., withdrawn) from the surface 10a. Also, the position of the surface 20b of the second impact absorbing member 20 inserted into the hole 13 may also protrude slightly on the reinforcement 60 side from the surface 10b of the first impact absorbing member 10, and may be slightly back from the surface 10b.

A cushioning material 31 having an area smaller than the surface 20a on the bumper cover 50 (i.e., the counterpart member 4) side of the second impact absorbing member 20 shown in FIG. 5A and the like is provided on this surface 20a. The surface 20a on the bumper cover side is a portion that faces the bumper cover 50, and the cushioning material 31 is a member that suppresses contact noise between the second impact absorbing member 20 and the bumper cover 50. The cushioning material 31 shown in FIG. 5A has a smaller area than the surface 20a described above, but may also have an area that is larger than the surface 20a described above particularly when the cushioning material 31 is fixed to the surface 20a after the second impact absorbing member 20 is inserted into the hole 13. Also, cushioning material 32 is provided on the surface 20b on the reinforcement 60 (i.e., the counterpart member 4) side of the second impact absorbing member 20 shown in FIG. 8 and the like. The surface 20b on the reinforcement side is a portion that faces the reinforcement 60, and the cushioning material 32 is a member that suppresses contact noise between the second impact absorbing member 20 and the reinforcement 60. The cushioning material 32 shown in FIG. 8 has a larger area than the surface 20b, but may also have a smaller area than the surface 20b. Here, the cushioning materials 31 and 32 will be collectively referred to as the cushioning material 30. Fabric such as nonwoven fabric, or elastic material such as an elastomer, or the like may be used for the cushioning material 30.

(3) Assembly Method, Operation, and Effect of the Vehicle Bumper Structure

Next, an example of an assembly method of the vehicle bumper structure 2 including the absorber 3, together with the operation and effect thereof, will be described.

First, the cushioning material 31 is affixed to the surface 20a on the bumper cover side of the second impact absorbing member 20, as shown in FIG. 5. The cushioning material 31 may be affixed using an adhesive, for example. Next, the second impact absorbing member 20 is inserted into the hole 13 from the reinforcement 60 side of the first impact absorbing member 10, as shown in FIG. 8. Then, the protruding portion 22 gradually bites into the inside wall 14 of the hole 13 along the inclined portion 24, pushing the inside wall 14 of the hole 13 out, as shown in FIGS. 9A and 9B. As a result, the second impact absorbing member 20 is easily inserted into the hole 13. Movement of the second impact absorbing member 20 in the insertion direction D1 is inhibited when the extended portion 26 of the second impact absorbing member 20 catches on the recess 13a of around the hole 13. As a result, the second impact absorbing member 20 is inhibited from being inserted too far (i.e., being inserted farther than designed) into the hole 13. In this way, the absorber 3 is formed.

As shown in FIG. 9B, the vertical wall portion 25 of the protruding portion 22 that bites into the inside wall 14 of the hole catches on the inside wall 14 of the hole, so the second impact absorbing member 20 is inhibited from moving in the separating direction D2. As a result, the second impact absorbing member 20 is able to be fixed to the first impact absorbing member 10 without insert forming, and even without using a fixing member.

When the second impact absorbing member 20 is inserted into the hole 13, the cushioning material 32 is then affixed to the surface 20b on the reinforcement side of the second impact absorbing member 20, also including around the hole 13, as shown in FIG. 8. The cushioning material 32 may be affixed by an adhesive, for example. Then, the protrusion-shaped fitting portion 12 of the absorber 3 is inserted into the through-hole (i.e., the fitting portion 62) of the reinforcement 60, such that the absorber 3 provided with the cushioning material 30 is fixed to the reinforcement 60, as shown in FIG. 3. Finally, the vehicle bumper structure 2 is formed when the bumper cover 50 is mounted to the vehicle body 5. The assembly order of the vehicle bumper structure 2 may be modified as appropriate. For example, the cushioning material 31 may be affixed to the surface 20a after the second impact absorbing member 20 is inserted into the hole 13.

As shown in FIG. 10, with the bumper cover 50 and the reinforcement 60 as the counterpart member 4, the cushioning material 30 that suppresses contact noise between the second impact absorbing member 20 and the counterpart member 4 is provided on a portion (20a and 20b) of the second impact absorbing member 20 that faces the counterpart member 4. If the cushioning material 30 is not provided, the rigidity of the second impact absorbing member 20 is higher than the rigidity of the first impact absorbing member 10, so an abnormal noise may be generated by the second impact absorbing member 20 contacting the counterpart member 4 due to vibration or the like while the vehicle 800 is running. Providing the cushioning material 30 enables this kind of abnormal noise to be suppressed.

Further, FIG. 10 is a view of an example of a test in which a barrier 700 is struck against the bumper 1 from the rear at an angle. When an impact force F1 is applied to the bumper 1 from the barrier 700, the impact force F1 is transmitted to the second impact absorbing member 20 that is near the functional component 40. The second impact absorbing member 20 that is more rigid than the first impact absorbing member 10 is stops the impact, so if the impact force F1 is light, deformation of and damage to the functional component 40 is inhibited and the function of the functional component 40 is able to be maintained. Naturally, an impact input to the bumper cover 50 in a location far from the functional component 40 is absorbed mainly by the first impact absorbing member 10. Therefore, this vehicle bumper structure 2 is able to absorb an impact, as well as inhibit deformation of and damage to the functional component 40, when an impact is input.

The absorber 3 provided with the second impact absorbing member 20 having the protruding portion 22 displays an effect in which it obviates the need for a fixing member for the second impact absorbing member 20, without insert forming. Therefore, the invention has a mode in which the bumper absorber 3 provided on a vehicle has impact absorbing members 10 and 20, the second impact absorbing member 20 has the protruding portion 22 that protrudes outward D11 on the side surface 21 with respect to the insertion direction D1 into the hole 13, and the second impact absorbing member 20 is inhibited from moving in a direction (D2) opposite the insertion direction D1 by the protruding portion 22 biting into the inside wall 14 of the hole 13 in the first impact absorbing member 10. The invention also has a mode of only the second impact absorbing member.

Further, the absorber 3 provided with the second impact absorbing member 20 having the extended portion 26 displays an effect in which the second impact absorbing member 20 is inhibited from being inserted into the hole 13 farther than designed. Related art in which the extended portion 26 is not provided has the disadvantage that a reinforcing buffer may be inserted too far into the buffer main body. Therefore, the invention has a mode in which the bumper absorber 3 provided on a vehicle has impact absorbing members 10 and 20, the second impact absorbing member 20 has the extended portion 26 that protrudes outward D11 on the edge portion 21e on the side opposite the insertion direction D1 of the side surface 21 with respect to the insertion direction D1 into the hole 13, and the second impact absorbing member 20 is inhibited from moving in the insertion direction D1 by the extended portion 26 catching on the first impact absorbing member 10. The invention also has a mode of only the second impact absorbing member.

Further, the vehicle bumper structure 2 having the cushioning material 30 displays an effect of contact noise between the second impact absorbing member 20 and at least one of the bumper cover 50 and the reinforcement 60 being suppressed. In related art not provided with the cushioning material 30, an abnormal noise may be generated by vibration. Therefore, the invention has a mode in which in the vehicle bumper structure 2 provided with the absorber 3 between the bumper cover 50 and the reinforcement 60, the absorber 3 has the impact absorbing members 10 and 20, and with at least one of the bumper cover 50 and the reinforcement 60 as the counterpart member 4, a member (30) that inhibits contact noise between the second impact absorbing member 20 and the counterpart member 4 is provided on a portion of the second impact absorbing member 20 that faces the counterpart member 4. The invention also has a mode of a bumper absorber provided with a member that suppresses the contact noise.

(4) Modified Example

Various modified examples of the invention are also conceivable. Aside from a rear bumper, the location where the vehicle bumper structure 2 including the absorber 3 is arranged may also be a front bumper or the like. The basic effect of the invention is able to be obtained even without one or both of the cushioning materials 31 and 32. Also, the basic effect of the invention is able to be obtained without some or all of the extended portions 26. Further, the basic effect of the invention is able to be obtained without some or all of the protruding portions 22a to 22d.

Figure 11A:
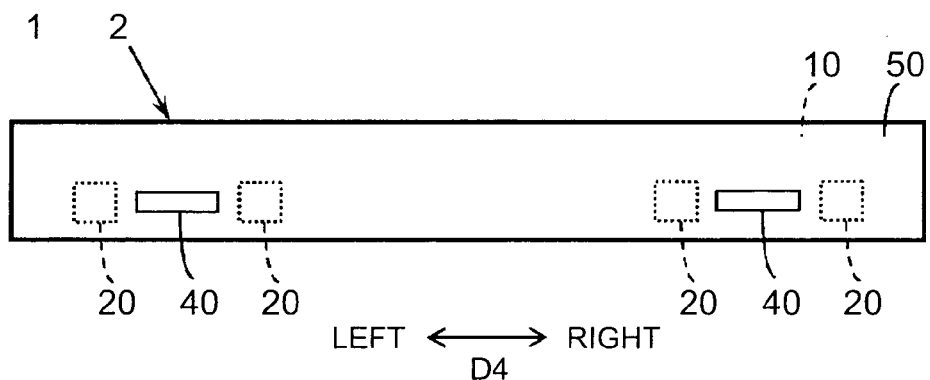
FIG. 11A is a view illustrating another bumper viewed from a rear side of a vehicle.
Figure 11B:
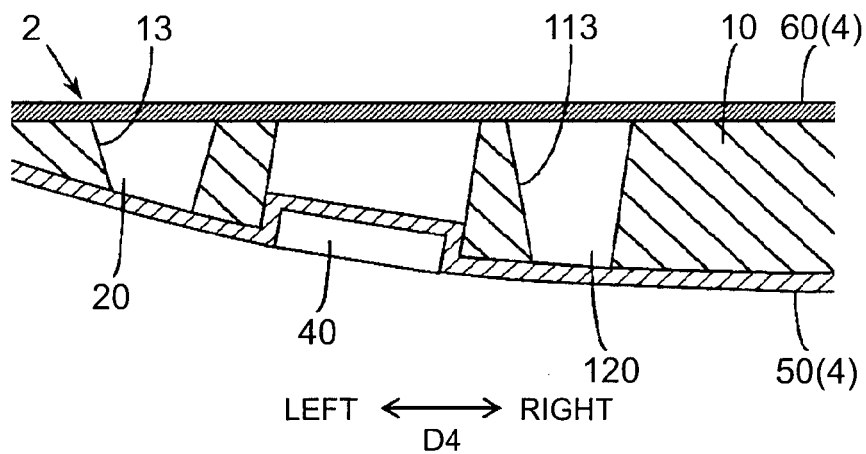
FIG. 11B is a horizontal sectional view illustrating another bumper structure.
Figure 11C:
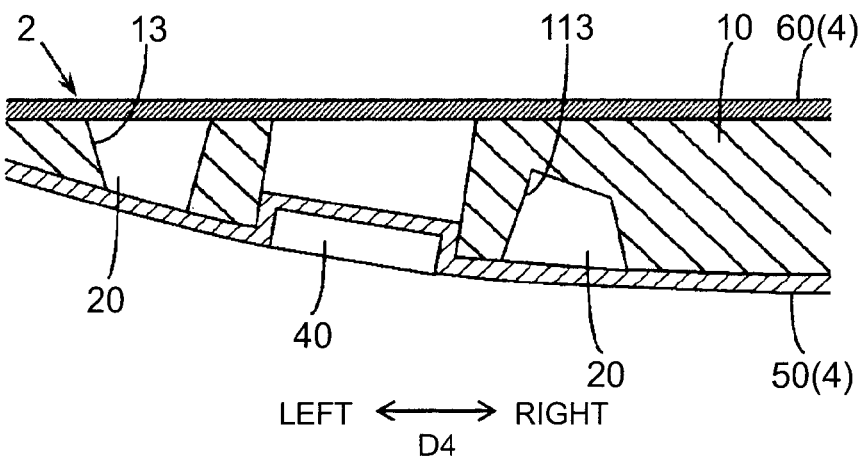
FIG. 11C is a horizontal sectional view illustrating yet another bumper structure.

The second impact absorbing member 20 may also be provided to the inside in the vehicle width direction D4 of the functional component 40, as shown in FIG. 11A. In this case, a hole 113 having a different shape than the hole 13 may be formed in the first impact absorbing member 10, and a second impact absorbing member 120 having a different shape than the second impact absorbing member 20 may be inserted into the hole 113, as shown in FIG. 11B. Also, second impact absorbing members 20 having the same shape may be arranged to the outside and the inside in the vehicle width direction D4 of the functional component 40, as shown in FIG. 11C. The hole 113 in this case is not a through-hole, but is a hole that is recessed from the surface of the first impact absorbing member 10. The second impact absorbing member 20 display an effect of suppressing deformation of the functional component 40, even if not to the outside of the functional component 40 in the vehicle width direction D4. Also, as long as the second impact absorbing member 20 is near the functional component 40, the second impact absorbing member 20 may be arranged above the functional component 40 or below the functional component 40.

(5) Conclusion

As described above, the invention provides, by various modes, technology of a vehicle bumper structure capable of absorbing an impact, as well as inhibiting deformation of a functional component, when an impact is input, and technology of a bumper absorber capable of obviating the need for a fixing member for a second impact absorbing member without insert forming, and the like. Naturally, the basic operation and effects described above are also able to be obtained with technology from only a mechanism relating to an independent claim (including the mode described in the example embodiment), without having a mechanism relating to a dependent claim. Further, other structures, such as a structure in which the structures described in the example embodiment and the modified examples are interchanged or the combination of those structures is changed, and a structure in which the structures described in known art as well as the example embodiment and modified examples described above are interchanged or the combination of those structures is changed, are also possible. The invention also includes these structures and the like.

The invention claimed is:

1. A vehicle bumper structure of a vehicle, the vehicle bumper structure comprising:
    a functional component having a function other than an impact absorbing function;
    a bumper cover;
    a reinforcement; and
    an absorber provided between the bumper cover and the reinforcement, the absorber including: (i) a first impact absorbing member defining a hole near the functional component, and (ii) a second impact absorbing member being inserted into the hole, the second impact absorbing member being more rigid than the first impact absorbing member, and the second impact absorbing member being provided outside of the functional component in a width direction of the vehicle, wherein:
    the second impact absorbing member has a protruding portion protruding away from the second impact absorbing member in an insertion direction of the second impact absorbing member into the hole, the protruding portion provided on a side surface of the second impact absorbing member with respect to the insertion direction; and
    movement of the second impact absorbing member in a direction opposite the insertion direction is inhibited by the protruding portion biting into an inside wall of the hole in the first impact absorbing member.

2. The vehicle bumper structure according to claim 1, wherein the protruding portion has an inclined portion and a vertical wall portion, the inclined portion being inclined toward the side surface of the second impact absorbing member, where an apex portion of the vertical wall portion, which is disposed at a location of the vertical wall portion furthest from the side surface of the second impact absorbing member, inhibits the second impact absorbing member from moving in the direction opposite the insertion direction by catching on the inside wall of the hole.

3. The vehicle bumper structure according to claim 1, wherein a member that suppresses contact noise between the second impact absorbing member and at least one of the bumper cover and the reinforcement is provided on a portion of the second impact absorbing member facing the at least one of the bumper cover and the reinforcement.

4. The vehicle bumper structure according to claim 1, wherein:
    the second impact absorbing member has an extended portion protruding outward from an intersection of the side surface of the second impact absorbing member and a bottom of the second impact absorbing member, the extended portion being provided on the side surface of the second impact absorbing member; and
    movement of the second impact absorbing member in the insertion direction is inhibited by the extended portion catching on the first impact absorbing member.

5. The vehicle bumper structure according to claim 1, wherein the second impact absorbing member is wider on a side facing the reinforcement than on a side facing the bumper cover.

6. A bumper absorber provided on a vehicle, the bumper absorber comprising:
    a first impact absorbing member defining a hole; and
    a second impact absorbing member inserted into the hole, the second impact absorbing member being more rigid than the first impact absorbing member, wherein:
    the second impact absorbing member has a protruding portion protruding away from the second impact absorbing member in an insertion direction of the second impact absorbing member into the hole, the protruding portion provided on a side surface of the second impact absorbing member with respect to and the insertion direction; and
    movement of the second impact absorbing member in a direction opposite the insertion direction is inhibited by the protruding portion biting into an inside wall of the hole in the first impact absorbing member.

* * * * *